(12) United States Patent
Dosaka et al.

(10) Patent No.: US 8,698,620 B2
(45) Date of Patent: Apr. 15, 2014

(54) WIRELESS COMMUNICATIONS DEVICE

(75) Inventors: Junya Dosaka, Kodaira (JP); Osamu Sato, Kodaira (JP); Hideyuki Yanagiya, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 515 days.

(21) Appl. No.: 12/654,612

(22) Filed: Dec. 24, 2009

(65) Prior Publication Data
US 2010/0156648 A1    Jun. 24, 2010

(30) Foreign Application Priority Data
Dec. 24, 2008  (JP) ................................. 2008-327351

(51) Int. Cl.
G08B 1/08      (2006.01)
G08B 21/00     (2006.01)

(52) U.S. Cl.
USPC ..................... 340/539.11; 340/539.1; 340/635

(58) Field of Classification Search
USPC .............. 340/635, 650, 652, 653, 657, 691.1, 340/691.8, 539.1, 539.11, 539.22; 345/1.1, 345/1.2, 1.3, 169, 173, 474; 455/404.2, 455/525, 556.2, 445, 432.2, 552.1; 715/778, 835, 967; 714/25, 37, 46; 370/338, 349
See application file for complete search history.

(56) References Cited

U.S. PATENT DOCUMENTS 7,248,229 B2 *  7/2007  Zerphy et al. .................. 345/1.3
7,278,112 B2 * 10/2007  Numano ........................ 715/778
7,432,877 B2 * 10/2008  Sagawa .......................... 345/1.2
7,825,916 B2 * 11/2010  Yajima et al. .................. 345/204
7,983,682 B2 *  7/2011  Halkka et al. .................. 455/445
7,986,282 B2 *  7/2011  Zerphy et al. .................. 345/1.3
8,195,123 B2 *  6/2012  Cho et al. .................... 455/404.2
2008/0246889 A1 * 10/2008  Moon ............................ 348/734
2009/0083582 A1 *  3/2009  Kil et al. ........................ 714/37
2011/0124362 A1    5/2011  Wakasa et al.

FOREIGN PATENT DOCUMENTS

JP    2004-172873 A    6/2004
JP    2006-014246      1/2006
JP    2006-310998      9/2006
JP    2008-086047      4/2008
JP    2008-219719      9/2008

OTHER PUBLICATIONS

Office Action issued on Oct. 17, 2012 in corresponding Japanese application No. 2008-327351.
Office Action dated Nov. 6, 2013 issued in corresponding Japanese application No. 2012-280713.

* cited by examiner

*Primary Examiner* — Van T. Trieu
(74) *Attorney, Agent, or Firm* — Bacon & Thomas, PLLC

(57) ABSTRACT

A wireless communications device for performing wireless communications includes a notifying unit for notifying a user of a status of the corresponding wireless communications device when a dedicated user interface is manipulated, a display unit and a detector for detecting failure in the display unit. The notifying unit notifies the user of the status of the corresponding wireless communications device when a failure in the display unit is detected by the detector and prevents the status of the corresponding wireless communications device from being notified when the failure in the display unit is not detected by the detector.

19 Claims, 10 Drawing Sheets

FIG.2A

| NO. | ITEM | CONTENT |
|---|---|---|
| 1 | BROADCAST COMMUNICATIONS CALL RECEPTION | BROADCAST COMMUNICATIONS (ONE TO N COMMUNICATION) RECEPTION WITH RESPECT TO A GROUP INCLUDING MOBILE STATIONS FROM CONTROL STATION OR WIRELESS CONTROL STATION |
| 2 | CONTROL COMMUNICATIONS CALL RECEPTION | INDIVIDUAL COMMUNICATIONS AND GROUP COMMUNICATIONS FROM A CONTROL STATION OR A WIRELESS CONTROL STATION. TARGET STATION DURING COMMUNICATIONS AUTOMATICALLY PERFORMS FORCED INTERRUPTION AND IS DRAWN TO COMMUNICATIONS. IN INDIVIDUAL COMMUNICATIONS, DUPLEX COMMUNICATIONS ARE PERFORMED. IN GROUP COMMUNICATIONS, ONE TO N COMMUNICATIONS ARE PERFORMED. THEREFORE, COMMUNICATIONS IN PRESS-TO-TALK METHOD ARE PERFORMED. |
| 3 | EMERGENCY CONTACT CALL | CONTENT THAT AN EMERGENCY CONTACT IS TO BE PERFORMED FROM A MOBILE STATION TO A CONTROL STATION OR A WIRELESS CONTROL STATION IS NOTIFIED. NOTIFICATION CAN BE DONE IN CASE WHERE THE CONTROL STATION OR WIRELESS CONTROL STATION IS PERFORMING COMMUNICATIONS OR IN A CASE WHERE THERE IS NO SPACE IN COMMUNICATIONS CHANNEL. |
| 4 | AID COMMUNICATIONS CALL AND CALL RECEPTION | VARIOUS COMMUNICATIONS (INDIVIDUAL COMMUNICATIONS, GROUP COMMUNICATIONS, PBX COMMUNICATIONS, BROADCAST COMMUNICATIONS, CONTROL COMMUNICATIONS, PRIVATE CHANNEL COMMUNICATIONS, AND EMERGENCY CONTACT) CAN BE PERFORMED BETWEEN LOCAL GOVERNMENTS. STARTING AND STOPPING OF THE PRESENT COMMUNICATIONS CAN BE DONE BY THE CONTROL STATION OR WIRELESS CONTROL STATION. |

FIG.2B

| NO. | ITEM | CONTENT |
|---|---|---|
| 5 | PRIVATE CHANNEL COMMUNI-CATIONS | PRIVATE CHANNEL COMMUNICATIONS OF PRIVATELY USING COMMUNICATIONS CHANNEL CAN BE PERFORMED BY SETTING A PRIVATE CHANNEL COMMUNICATIONS BY THE CONTROL STATION. THE PRIVATE CHANNEL COMMUNICATIONS GIVE NUMBER FOR IDENTIFYING THE TARGET STATION AND THE MOBILE STATION DESIGNATES THE PRIVATE CHANNEL COMMUNICATIONS DISTINGUISHING NUMBER TO JOIN IN COMMUNICATIONS. THE PRIVATE CHANNEL COMMUNICATIONS ARE REALIZED BY COMMUNICATIONS IN A PRESS-TO-TALK METHOD. STARTING AND STOPPING OF THE PRESENT COMMUNICATIONS CAN BE PERFORMED BY THE CONTROL STATION OR WIRELESS CONTROL STATION. |
| 6 | INDIVIDUAL COMMUNI-CATIONS | IN COMMUNICATIONS USING A BASE STATION BETWEEN THE CONTROL STATION AND THE MOBILE STATION OR A BASE STATION BETWEEN MOBILE STATIONS, DUPLEX COMMUNICATIONS (ONE TO ONE COMMUNICATION) CAN BE PERFORMED IN A SELECTIVE CALL METHOD USING A PRIVATE NUMBER. |
| 7 | GROUP COMMUNI-CATIONS | COMMUNICATIONS WITH GROUP INCLUDING MOBILE STATIONS (ONE TO N COMMUNICATIONS) CAN BE PERFORMED FROM A CONTROL STATION OR MOBILE STATION. GROUP NUMBER IS USED FOR DESIGNATING A TARGET STATION AND ONLY A STANDBY STATION IS DESIGNATED. SINCE GROUP COMMUNICATIONS ARE ONE TO N COMMUNICATIONS, COMMUNICATIONS IN THE PRESS-TO-TALK METHOD ARE PERFORMED. |
| 8 | NON-VOICE COMMUNI-CATIONS | IN NON-VOICE COMMUNICATIONS, COMMUNICATIONS CHANNELS ARE ASSIGNED TO ONE COMMUNICATIONS TO PERFORM A PARALLEL SIMULTANEOUS TRANSMISSION SO THAT A HIGH SPEED TRANSMISSION CAN BE ACHIEVED. |

FIG. 5A

| NO. | STORAGE CONTENT (VOICE CONTENT) | CONDITION |
|---|---|---|
| 1 | BASE STATION COMMUNICATIONS MODE | BASE STATION COMMUNICATIONS MODE INCLUDING CASES OTHER THAN RETURNING OPERATION AND PRIVATE CHANNEL COMMUNICATIONS |
| 2 | AUTOMATIC DIRECT COMMUNICATIONS MODE | DIRECT COMMUNICATIONS IS AUTOMATICALLY PERFORMED |
| 3 | MANUAL DIRECT COMMUNICATIONS MODE | DIRECT COMMUNICATIONS IS MANUALLY PERFORMED |
| 4 | PRIVATE COMMUNICATIONS MODE | PRIVATE CHANNEL COMMUNICATIONS IS PERFORMED IN BASE STATION COMMUNICATIONS MODE |
| 5 | RETURNING COMMUNICATIONS MODE | RETURNING OPERATION IS MADE IN BASE STATION COMMUNICATIONS MODE |

FIG.5B

| NO. | STORAGE CONTENT (VOICE CONTENT) | CONDITION |
|---|---|---|
| 1 | WITHIN-THE-SERVICE-AREA | WITHIN THE SERVICE AREA IN BASE STATION COMMUNICATIONS MODE (INCLUDING BASE STATION RETURNING OPERATION AND PRIVATE CHANNEL COMMUNICATIONS) |
| 2 | OUT-OF-SERVICE-AREA | OUT OF SERVICE AREA IN BASE STATION COMMUNICATIONS MODE |
| 3 | NO STORAGE | DIRECT COMMUNICATIONS (AUTOMATIC AND MANUAL) |

FIG.5C

| NO. | STORAGE CONTENT (VOICE CONTENT) | CONDITION |
|---|---|---|
| 1 | BATTERY REMAINING AMOUNT 3 | BATTERY LEVEL 4 |
| 2 | BATTERY REMAINING AMOUNT 2 | BATTERY LEVEL 3 |
| 3 | BATTERY REMAINING AMOUNT 1 | BATTERY LEVEL 2 |
| 4 | BATTERY REMAINING AMOUNT 0 | BATTERY LEVEL 1 |
| 5 | NO STORAGE | VEHICLE MOUNTED TERMINAL AND FIXED PATTERN |

FIG.8A
100
FIG.8B
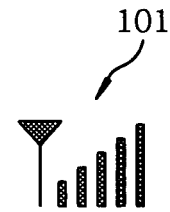
101
FIG.8C
102
OSA
FIG.8D
103
DC

WIRELESS COMMUNICATIONS DEVICE

FIELD OF THE INVENTION

The present invention relates to a wireless communications device, and more particularly, to a technology of notifying a user of the status of the wireless communications device.

BACKGROUND OF THE INVENTION

Recently, a size of a display screen of a wireless communications device such as a mobile telephone or a wireless communications terminal of a private mobile communications system increases as the functionality of the wireless communications device expands. The wireless communications device can be made more convenient to be used by utilizing increased size of the display screen and a graphical user interface (GUI).

Further, in the conventional wireless communications device, for example, icons 100 to 103, each of which represents a status of the wireless communications device, are displayed on the display screen as shown in FIGS. 8A to 8D. A battery icon 100 shown in FIG. 8A represents the battery remaining charge amount of the wireless communications device. An antenna icon 101 shown in FIG. 8B represents a receiving status of a radio wave from a base station. An out-of-service-area (OSA) icon 102 shown in FIG. 8C represents a status, in which the radio wave cannot be received from the base station. A direct communications (DC) icon 103 shown in FIG. 8D represents that the wireless communications device is in a direct communications mode that conducts direct communications between wireless communications devices without passing through the base station.

Also, there is a conventional technology of notifying a user whether the wireless communications terminal is in the service area or out of the service area (e.g., see Japanese Patent Laid-Open Application No. H11-122649).

However, when the display screen is out of order or is damaged, the icons 100 to 103 shown in FIGS. 8A to 8D cannot be seen so that the user cannot identify the status of the wireless communications device in the conventional wireless communications device.

In particular, for business communications and disaster emergency communications, it is necessary to have a disaster prevention wireless communication system that can be used to operate even in an emergency (e.g., Regional Digital Mobile Telecommunication System (ARIB STD-T79) issued by Association of Radio Industries and Businesses).

However, the disaster prevention wireless communication system has various communications modes such as a direct communications mode between terminals in addition to a common base station communications mode, so that a manipulation content and an accessible communications target vary with each communications mode.

Therefore, when the display screen of the wireless communications device is broken, the user cannot recognize a current communications mode and will have no information on whether the device is in the service-area or out-of-service-area and no information on the battery remaining charge amount. Therefore, even if the user memorizes a method of using the corresponding wireless communications device, it is extremely difficult to correctly manipulate the corresponding wireless communications device.

In addition, there may be users, e.g., employees of a government office or publics, who are not accustomed to the disaster prevention wireless communication system since the disaster prevention wireless communication system is variously used in an emergency, and if they use the disaster prevention wireless communication system, damage caused by the difficulty in recognizing the status of the wireless communications device due to the broken display screen can be significantly increased.

Moreover, although the technology of Japanese Patent Laid-Open Application No. H11-122649 is to notify the user of a status change of the wireless communications device from the out-of-service-area to the service area or vice versa, the user cannot be aware of the current status of the wireless communications device when the display screen is broken if the user does not subscribe to an automatic notification contract.

SUMMARY OF THE INVENTION

In view of the above, the present invention provides a wireless communications device capable of allowing a user to recognize a status of the wireless communications even when a screen display function does not work.

In accordance with an aspect of the present invention, there is provided a wireless communications device for performing wireless communications, including: a notifying unit for notifying a user of a status of the corresponding wireless communications device when a dedicated user interface is manipulated.

Further, the wireless communications device described above includes: a display unit; and a detector for detecting failure in the display unit, wherein the notifying unit notifies the user of the status of the corresponding wireless communications device when the failure in the display unit is detected by the detector and prevents the status of the corresponding wireless communications device from being notified when the failure in the display unit is not detected by the detector.

Moreover, the wireless communications device described above further includes: an output unit for outputting sound; and a controller for controlling output sound from the outputting unit, wherein the notifying unit preferably notifies the user of the status of the corresponding wireless communications device based on a manipulation of the dedicated user interface even when the output sound from the output unit is controlled not to be outputted by the controller.

Further, the notifying unit may change notification contents depending on a manipulation pattern of the dedicated user interface.

In accordance with the wireless communications device of the present invention, when a dedicated user interface is manipulated, since the status of the corresponding wireless communications device is notified, the user of the corresponding wireless communications device can correctly recognize the status thereof even when the screen display function does not work.

BRIEF DESCRIPTION OF THE DRAWINGS

The objects and features of the present invention will become apparent from the following description of embodiments, given in conjunction with the accompanying drawings, in which:

FIGS. 2A and 2B are a view illustrating the kind of the wireless communications carried out in the wireless communications device in the wireless communications system shown in FIG. 1;

FIGS. 5A to 5C are views respectively illustrating corresponding examples between the notification contents and conditions stored in the storage unit of the wireless communications device in accordance with the embodiment of the present invention, in which FIG. 5A is a view illustrating communications modes, FIG. 5B is a view illustrating the synchronization states of a base station, and FIG. 5C is a view illustrating the remaining charge amounts of a battery;

FIGS. 8A to 8D are views illustrating examples of the icons displayed on the display screen of a conventional wireless communications device, in which FIG. 8A shows a battery icon, FIG. 8B shows a radio wave icon, FIG. 8C shows an out-of-coverage icon, and FIG. 8D shows a direct communications icon.

DETAILED DESCRIPTION OF EMBODIMENTS

Hereinafter, embodiments of the present invention will be described with reference to the accompanying drawings.

[1] Embodiment of the Present Invention

First, an example of a wireless communications system, to which a wireless communications device is applied, will be described with reference to FIG. 1 before describing the wireless communications device in accordance with an embodiment of the present invention (hereinafter, referred to as the wireless communications device) in detail.

Figure 1:
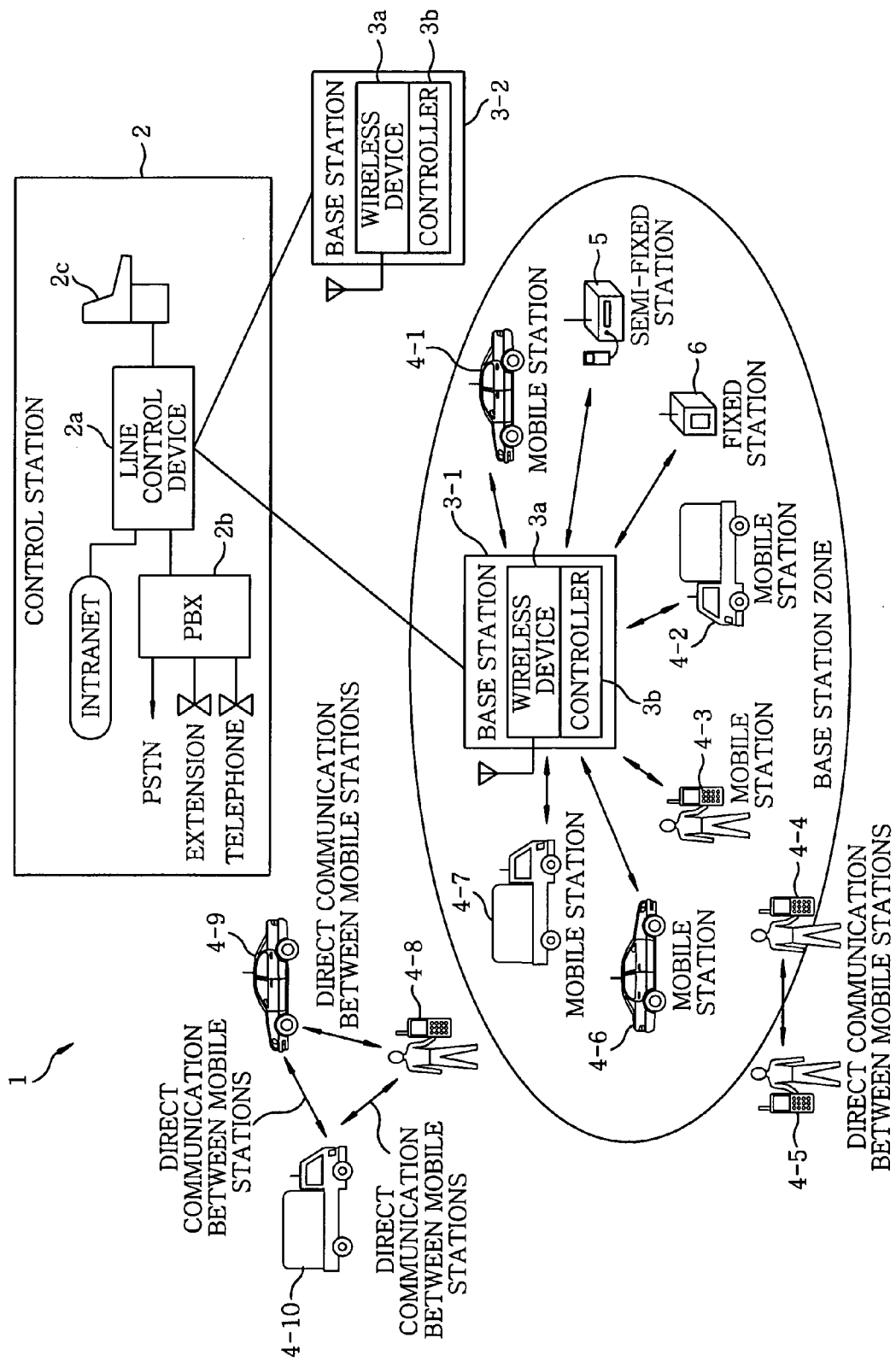
FIG. 1 is a view illustrating an example of a wireless communications system, to which a wireless communications device in accordance with an embodiment of the present invention is applied.

The wireless communications system 1 illustrated in FIG. 1 is, for example, a Regional Digital Mobile. Telecommunication System defined by ARIB STD-T79, and adopts a time division multiple access (TDMA) method as a wireless communications method.

The wireless communications system 1 includes a control station 2, a plurality of (here, two) base stations 3-1 and 3-2, mobile stations 4-1 to 4-10, a semi-fixed station 5, and a fixed station 6.

The control station 2 is locally installed in a region, namely city, town and the like, and includes a line control device 2a for controlling connection to a line, a private branch exchange (PBX) 2b for controlling connection between a terrestrial line (for example, public switched telephone networks (PSTN) or an extension telecommunication network) and a mobile wireless line, and a control center 2c for controlling communications.

The base stations 3-1 and 3-2 are connected to the line control device 2a of the control station 2 to perform wireless communications with the mobile stations 4-1 to 4-10, the semi-fixed station 5, and the fixed station 6 (hereinafter, referred to as mobile stations) in the corresponding base station zone (also, referred to as a communications zone or a communications service area) or wireless relays among the mobile stations, and include a wireless device 3a and a control device 3b.

Also, the mobile stations can directly communicate with each other without passing through the base station 3-1.

The mobile stations 4-1 to 4-10, the semi-fixed station 5, and the fixed station 6 illustrated in FIG. 1 can be used as the wireless communications device in accordance with the present invention. Further, the wireless communications device in accordance with the present invention may be various types of portable, fixed, semi-fixed, and vehicle-mounted devices so long as they include the components illustrated in FIG. 3, which will be described later.

In the wireless communications system 1, the communications modes of the wireless communications devices such as the mobile stations 4-1 to 4-10 can be largely classified into two modes: a base station communications mode where wireless communications are performed with another wireless communications device through the base stations 3-1 and 3-2 and a direct communications mode among the mobile stations where direct wireless communications are performed with another wireless communications device without passing through the base stations 3-1 and 3-2.

Also, in the wireless communications system 1, the wireless communications device can have eight communications patterns illustrated in FIGS. 2A and 2B. That is, the wireless communications device can conduct broadcast communications call reception, control communications call reception, emergency contact call, aid communications call and call reception, private channel communications, individual communications, group communications, and non-voice communications. The eight patterns are illustrated in FIGS. 2A and 2B in detail.

Figure 3:
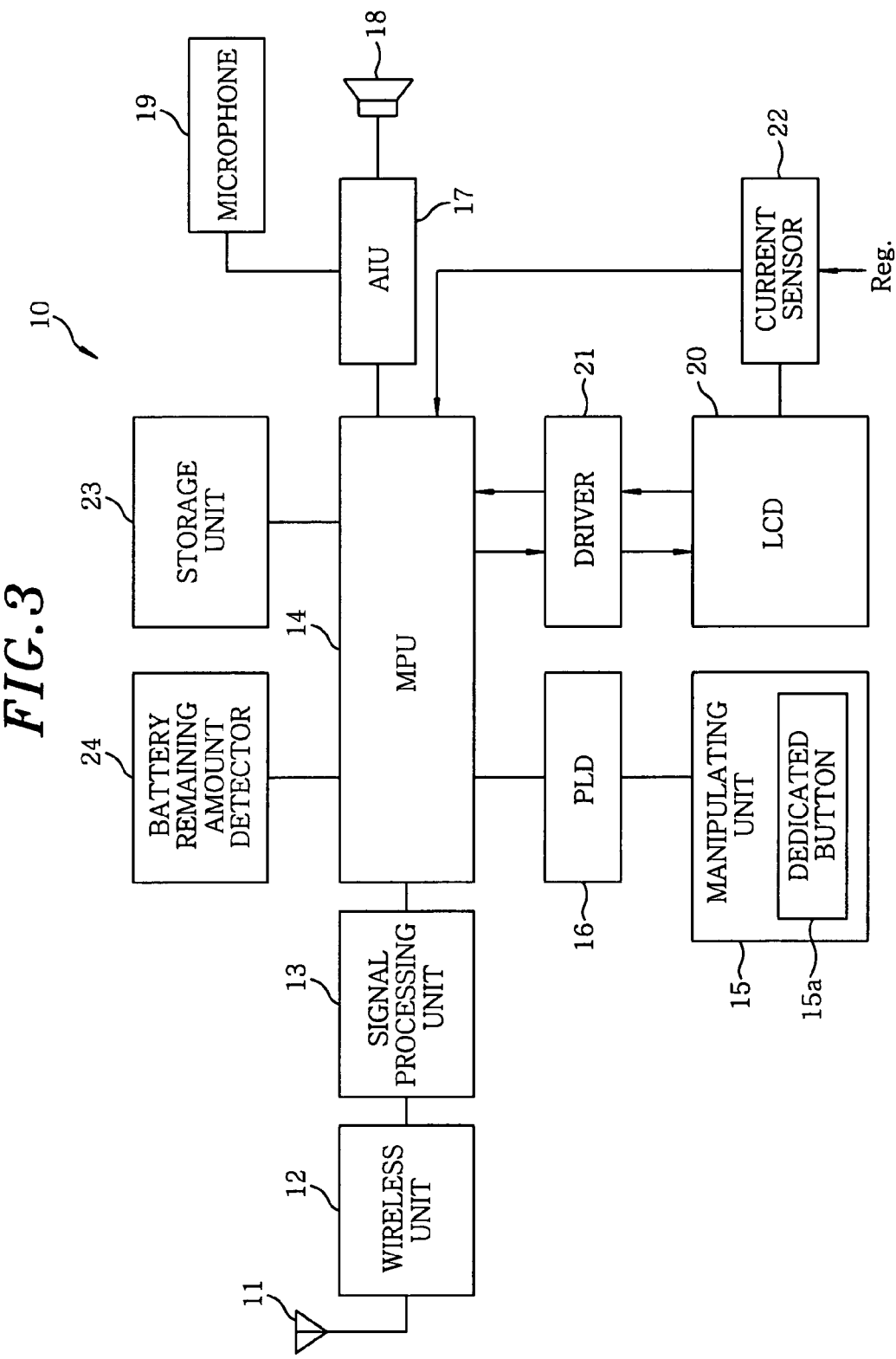
FIG. 3 is a block diagram illustrating an example of the configuration of the wireless communications device in accordance with the embodiment of the present invention.

FIG. 3 is a block diagram illustrating a functional configuration of the wireless communications device in accordance with the embodiment of the present invention.

As illustrated in FIG. 3, the wireless communications device 10 includes an antenna 11, a wireless unit 12, a signal processing unit 13, a micro processing unit (MPU) (detector, controller) 14, a manipulating unit 15, a programmable logic device (PLD) 16, an audio interface unit (AIU) 17, a speaker (output unit) 18, a microphone 19, a liquid crystal display (LCD) (display unit) 20, a driver 21, a current sensor (detecting unit) 22, a storage unit 23, and a battery remaining amount detector 24.

The wireless unit 12 performs wireless communications with another wireless communications device through the antenna 11. As described above, the wireless unit 12 performs wireless communications in the TDMA method.

The signal processing unit 13 is disposed between the wireless unit 12 and the MPU 14 and, for example, it converts a signal received by the wireless unit 12 into a signal that can be recognized by the MPU 14 and also converts the signal received from the MPU 14 into a signal that can be transmitted by the wireless unit 12.

The MPU 14 controls the entire wireless communications device 10. For example, the MPU 14 controls the AIU 17 and the speaker 18 to output voice message based on the signal inputted from the signal processing unit 13 through the speaker 18. Further, the MPU 14 controls the signal processing unit 13 and the wireless unit 12 to output the voice message inputted from the microphone 19 through the antenna 11 as a radio wave.

In addition, the MPU 14 sends a command and display data to the driver 21, which directly controls the LCD 20, to control the display content on the LCD 20. When reading and writing operations with respect to the display control of the driver 21 cannot be carried out, the MPU 14 also functions as the detector which detects failure in the LCD 20 through determination that the LCD 20 is out of order.

The manipulating unit 15 is, for example, a keypad manipulated by the user of the wireless communications device 10.

Figure 4:
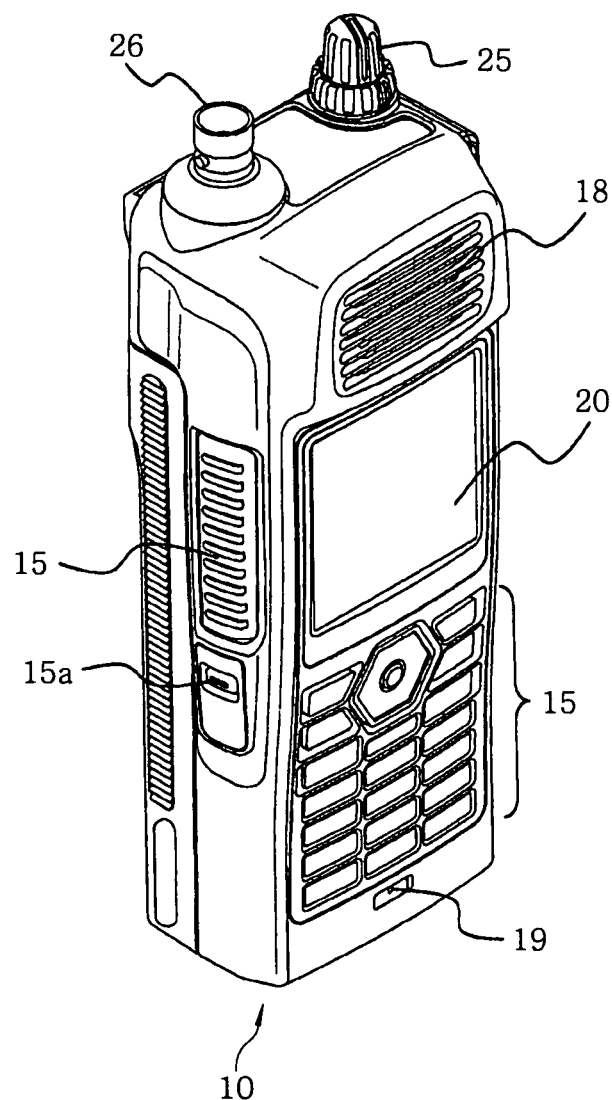
FIG. 4 is an external perspective view illustrating an example of the wireless communications device in accordance with the embodiment of the present invention.

Here, an example of the external perspective view of the wireless communications device 10 is illustrated in FIG. 4. As illustrated in FIG. 4, the manipulating unit 15 has a numerical keypad, an on-hook button, an off-hook button, a clear button, an arrow key, an enter key, a press button, and other function keys. Additionally, the wireless communications device 10 includes a control switch 25 and an antenna connector 26.

Further, the wireless communications device 10 includes a dedicated user interface (dedicated button) 15a used only for notifying a user of the status of the corresponding wireless communications device 10. Although description will be made in detail later in a flowchart shown in FIG. 7, the wireless communications device 10 is configured so that the MPU 14 notifies the user of the status (wireless status or battery remaining amount) of the wireless communications device 10 by sound through the speaker 18 when the dedicated button 15a is manipulated by the user.

Also, as illustrated in FIG. 4, the dedicated button 15a is not provided in such a way as to protrude from the surface of the wireless communications device 10 like the other buttons, but is provided to be recessed from the surface (here, left side surface) of the wireless communications device 10. That is, the dedicated button 15a is installed such that its surface is recessed toward the inside of the wireless communications device 10 with respect to the surface (left side surface) of the wireless communications device 10.

Therefore, it is designed such that the user cannot manipulate the dedicated button 15a if the user does not intentionally push the dedicated button 15a inwardly toward the wireless communications device 10, and an unintentional accidental operation of the dedicated button 15a can be prevented.

The PLD 16 delivers a manipulation input from each button and each key made by the manipulating unit 15 to the MPU 14. For example, when the dedicated button 15a is manipulated, the PLD 16 notifies the MPU 14 that the dedicated button 15a is manipulated.

The AIU 17, which is disposed among the MPU 14, the speaker 18, and the microphone 19, functions as an interface between the speaker 18 and the microphone 19. The AIU 17 includes, e.g., a digital analog converter (not shown), a filter circuit (not shown), and an amplifier (not shown), and converts the signal from the MPU 14 to output sound through the speaker 18.

The speaker 18 outputs sound, and may also be made to function as a receiver. The microphone 19 inputs sound to the wireless communications device 10.

Further, in the present embodiment, when the dedicated button 15a is manipulated, the MPU 14, the AIU 17, and the speaker 18 function as notifying units for notifying a user of the status of the wireless communications device 10.

In the present invention, the status of the wireless communications device 10 refers to communications modes (see FIG. 5A to be described later), service-area/out-of-service-area (synchronization state (on or off)), a battery remaining charge amount, a pre-set call number, and the contents of a telephone book. However, the present invention is not limited thereto. Various statuses information can be used so long as they are related to the status of the wireless communications device 10.

Also, voice message or beep sound may be used as means for the notification through the speaker 18.

Examples of the contents notified by the notifying unit are illustrated in FIGS. 5A to 5C. That is, the notification contents corresponding to respective conditions such as the communications mode, the synchronization state, and the battery remaining charge amount illustrated in FIGS. 5A to 5C are stored in the storage unit 23.

As illustrated in FIG. 5A, the current communications mode is notified by the notifying unit. Here, the current communications mode is related to a pre-set call transmission.

More specifically, the notifying unit notifies a user of the voice message of the 'base station communications mode' in the case where the communications mode is the base station communications mode including the cases other than a returning operation and the private channel communications.

In addition, the notifying unit notifies the user of the voice message of the 'automatic direct communications mode' in the case where the direct communications is automatically performed and notifies the user of the voice message of the 'manual direction communications mode' in the case where the direct communications is manually performed.

Also, the notifying unit notifies the user of the voice message of the 'private communications mode' in the case where the private channel communications is performed by the base station communications and notifies the user of the voice message of the 'returning communications mode' in the case where the returning operation is performed by the base station communications.

In the wireless communications device 10, these communications modes are controlled by the partial function of the MPU 14 or a dedicated controller (not shown), and thus the MPU 14 is configured to read the current communications mode from the above-described controller. Further, the communications mode can be converted by manipulating the manipulating unit 15 by the user.

As illustrated in FIG. 5B, as for the synchronization state of the base station related to the service-area/out-of-service-area, the notifying unit notifies nothing in the direct communications mode and notifies the user of the voice message of the service-area/out-of-service-area in the base station communications mode.

To be more specific, the notifying unit notifies the user of the voice message of 'service-area' in the case where the base station communications mode (including the private channel communications and the returning operation) is in the service area, and notifies the user of the voice message of 'out-of-service-area' in the case where the base station communications mode (including the private channel communications and the returning operation) is out of the service area.

Meanwhile, the notifying unit notifies nothing in the direct communications mode (in the automatic mode and the manual mode).

In addition, in the wireless communications device 10, the MPU 14 obtains the radio wave status (base station synchronization state) in the service-area/out-of-service-area from the wireless unit 12.

As illustrated in FIG. 5C, with regard to the battery remaining charge amount, the content is notified based on the battery level detected by the battery remaining amount detector 24.

Specifically, the notifying unit notifies the user of the voice message of the 'battery remaining amount 3' in the case where the battery level 4 is detected by the battery remaining amount detector 24, notifies the user of the voice message of the 'battery remaining amount 2' in the case where the battery level 3 is detected by the battery remaining amount detector 24, notifies the user of the voice message of the 'battery remaining amount 1' in the case where the battery level 2 is detected by the battery remaining amount detector 24, and notifies the user of the voice message of the 'battery remaining amount 0' in the case where the battery level 1 is detected by the battery remaining amount detector 24.

Further, the notifying unit does not notify the battery level when the wireless communications device 10 is vehicle mounted type or fixed type and is driven not by a battery but by a power source.

The pre-set call number notified by the notifying unit refers to the number called by manipulating, e.g., the off-hook button. When the pre-set call number is called out, the notifying unit notifies the user of the number and the corresponding name through voice message.

Further, when the notifying unit notifies the user of the contents of the telephone book, the corresponding names and numbers are sequentially notified. Since a phone number used by the wireless communications device 10 has about four- or five-digits, the user can relatively easily memorize the phone number even when the phone number is notified through voice message. Therefore, the user can be guided for inputting the phone number through voice message, thereby making it possible for the user to make a desired call.

The LCD 20, which is a display screen, is controlled by the driver 21 to display the icons 100 to 103 illustrated in FIGS. 8A to 8D, and various information on telephone numbers, the contents of the telephone book, and so on.

The driver 21 controls the display of the LCD 20 under the command from the MPU 14. Further, the driver 21 may be built in the module of the LCD 20 or may be externally attached.

The current sensor 22 senses the current in the LCD 20 to detect any failure in the LCD 20. A reference value (denoted by "Reg." in FIG. 3 and, e.g., reference current or reference voltage) may be inputted to the current sensor 22 in advance. Therefore, the current sensor 22 compares the reference value with the current value in the LCD 20 to detect any failure in the LCD 20 and a failure message is notified to the MPU 14 when the failure is detected. Further, multiple reference values may be inputted to the current sensor 22 in advance, and the current sensor 22 may detect the failure in the LCD 20 based not on the current value but on the voltage value.

Figure 6:
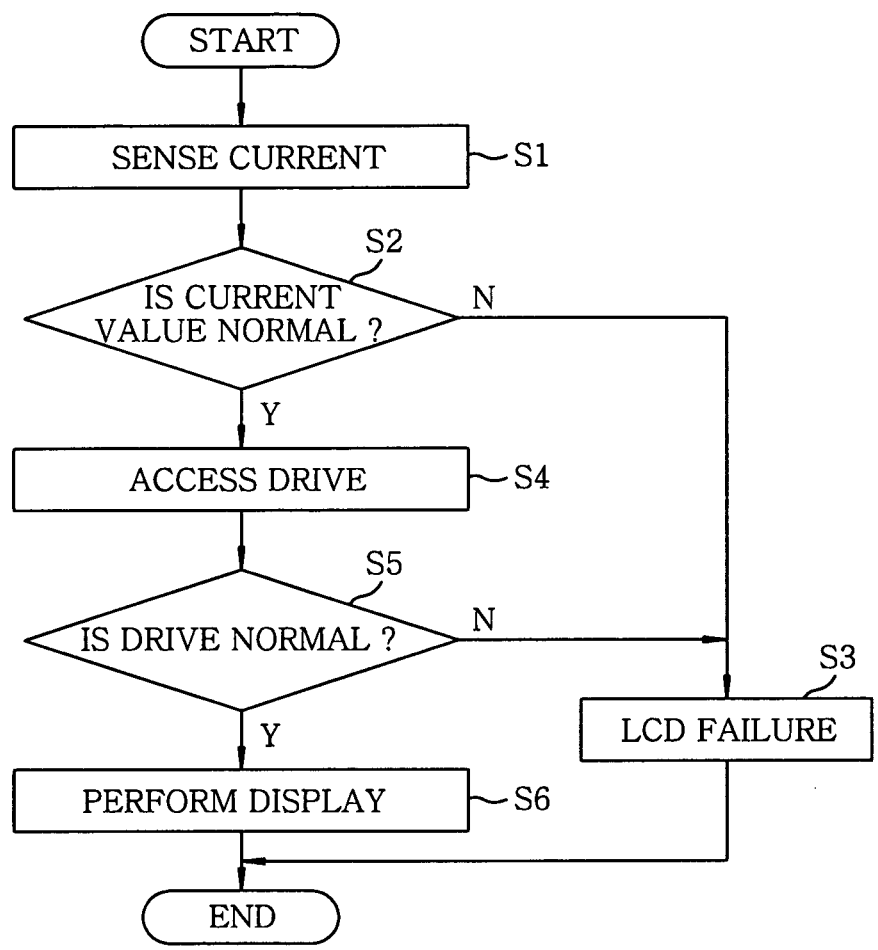
FIG. 6 is a flowchart illustrating an example of the sequence of detecting a failure in the LCD of the wireless communications device in accordance with the embodiment of the present invention.

Now, the sequence in which the failure in the LCD 20 of the wireless communications device 10 is detected will be described with reference to a flowchart (steps S1 to S6) illustrated in FIG. 6.

First, the current sensor 22 senses current in step S1 to determine whether the current value in the LCD 20 is normal value or not in step S2.

That is, the current sensor 22 determines whether an excessive current flows through the LCD 20 based on the reference value or no current flows through the LCD 20.

When the abnormal current value is detected in the LCD 20 (No in step S2), the current sensor 22 notifies the MPU 14 that the failure in the LCD 20 is detected. The MPU 14 determines that the LCD 20 is out of order in step S3.

On the other hand, when the normal current value in the LCD 20 is detected (Yes in step S2), the MPU 14 commonly accesses and commands the driver 21 to perform display in step S4 and determines whether the driver 21 is normally operated in step S5.

When it is determined that there is a failure in the driver 21, for example, that the MPU 14 cannot perform reading and/or writing (No in step S5), the MPU 14 determines that the LCD 20 is out of order in step S3.

Meanwhile, when the MPU 14 determines that the driver is normally operated (Yes in step S5), the driver 21 performs display in step S6, and the processing ends.

As described above, in the wireless communications device 10, each of the MPU 14 and the current sensor 22 functions as a detector for detecting the failure in the LCD 20.

In addition, as illustrated in FIG. 3, the storage unit 23 stores various information such as voice data (pulse code modulation (PCM) or linear data) for notifying the user of information on the telephone book and information on the wireless communications device 10, and information on beep sound.

More specifically, the storage unit 23 stores the voice data and the beep sound in advance to correspond to the status of the wireless communications device 10.

The battery remaining amount detector 24 detects the remaining charge amount of the battery of the wireless communications device 10. As illustrated in FIG. 5C, the battery remaining amount detector 24 detects the battery remaining charge amount in four levels (here, the battery levels 4 to 1).

Further, the battery remaining amount detector 24 may periodically detect the battery remaining charge amount and may detect the battery remaining charge amount under the command from the MPU 14.

The battery level detected by the battery remaining amount detector 24 is stored in the built-in memory (not shown) of the MPU 14 or the storage unit 23.

Figure 7:
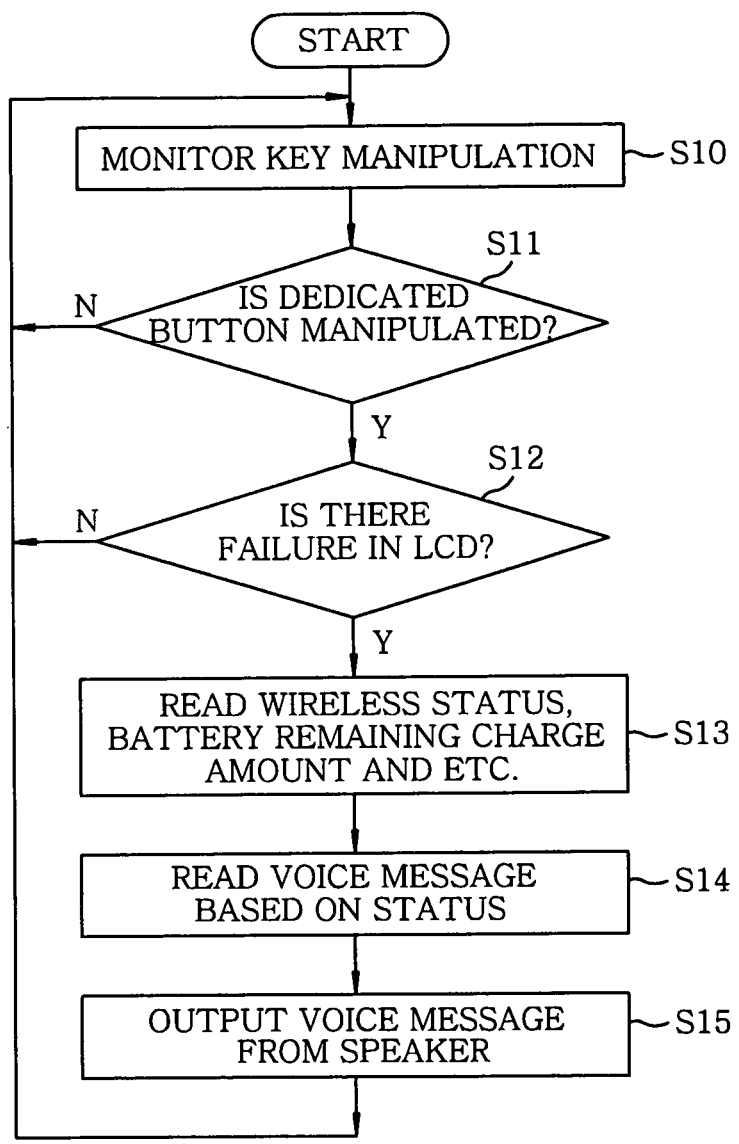
FIG. 7 is a flowchart illustrating an example of the sequence of notifying the user of the state of the wireless communications device in accordance with the embodiment of the present invention.

FIG. 7 is a flowchart (steps S10 to S15) illustrating an example of the operation sequence of notifying the status of the wireless communications device 10.

As illustrated in FIG. 7, during the operation of the wireless communications device 10, the MPU 14 monitors a key manipulation in step S10 while waiting for a notification, indicating that the dedicated button 15a is manipulated, to be received from the PLD 16. That is, so long as there is no notification that the dedicated button 15a is pressed, it does not proceed to the next processing related to a status notification (No in step S11).

When the notification that the dedicated button 15a is manipulated is received from the PLD 16 (Yes in step S11), the MPU 14 determines whether the failure in the LCD 20 is detected or not in step 12. When a failure in the LCD 20 is detected in the sequence illustrated in FIG. 6, the MPU 14 stores that the LCD 20 is out of order in its own memory or in an external memory.

When it is determined that the LCD 20 is normally operated (No in step S12), the MPU 14 does not perform the next processing related to the status notification, that is, does not notify the user of the status of the wireless communications device 10 through voice message but returns to the status of sensing the key manipulation.

On the other hand, when it is determined that there is a failure in the LCD 20 (Yes in step S12), the MPU 14 reads the wireless status (the communications mode, the-service-area/out-of-the-service-area, etc.) and the battery remaining charge amount from the storage unit 23 or another memory in order to notify the user of the status of the wireless communications device 10 through voice message in step S13.

In this manner, the MPU 14 notifies the user of the status of the wireless communications device 10 when the failure in the LCD 20 is detected and does not notify the user of the status of the wireless communications device 10 when the failure in the LCD 20 is not detected. That is, the MPU 14 serving as the notifying unit is configured to confirm the validity and the invalidity of the manipulation of the dedicated button 15a based on the detection result whether or not a failure in the LCD 20 is detected, so that the manipulation of the dedicated button 15a is made invalid when the LCD 20 is normally operated and that the manipulation of the dedicated button 15a is made valid when the failure in the LCD 20 is found.

Next, the MPU 14 reads the voice message (refer to FIGS. 5A to 5C) corresponding to the read wireless status and the battery remaining charge amount from the storage unit 23 in step S14.

Then, the MPU 14 outputs the read voice message through the speaker 18 in step S15 and returns to the processing of step S10.

At this point, the MPU 14 controls the AIU 17 and the speaker 18 to continuously notify the user of the contents of the current communications mode, the base station synchronization state, and the battery remaining charge amount. For example, the MPU 14 may output the voice message of the 'base station communications mode, being in the service area, and the battery remaining amount 2' from the speaker 18.

In addition, when the wireless communications device 10 is operated in the manual direct communications mode or the private channel communications mode without idle display, it is preferable that the MPU 14 may stop outputting received voices and then notify the user of the notification contents (voice message guidance) through the speaker 18.

Meanwhile, it is preferable that the MPU 14 outputs the voice message guidance only in an idle state in the cases other than the case where the wireless communications device 10 is operated in the private channel communications mode and the manual direct communications mode.

For example, the MPU 14 determines whether or not the current communications mode is other than the private channel communications mode and the manual direct communications mode between steps S11 and S12 or steps S12 and S13. And, when the current communications mode is the private channel communications mode or the manual direct communications mode, the MPU 14 stops outputting received voices and outputs the notification contents corresponding to the status of the wireless communications device 10 through the speaker 18 (steps S13 to S15).

Further, when the current communications mode is other than the private channel communications mode and the manual direct communications mode, the MPU 14 determines whether or not the current communications mode is currently in an idle state and outputs the notification contents through the speaker 18 only when idle is being displayed (that is, steps S13 to S15 are performed).

Also, when the current communications mode is other than the private channel communications mode and the manual direct communications mode and is not currently in the idle state but in the communications mode, the MPU 14 does not output the notification contents through the speaker 18 (that is, steps S13 to S15 are not performed).

As described above, the notifying unit of the wireless communications device 10 is configured to change the conditions of the status notification to be performed based on the current communications mode. Therefore, the wireless communications is ensured not to be disturbed by the status notification of the wireless communications device 10.

As described above, in the wireless communications device 10 in accordance with the embodiment of the present invention, when the dedicated button 15*a* is manipulated by the user, the MPU 14 notifies the user of the status of the wireless communications device 10 through the speaker 18 so that the user can correctly recognize the status of the wireless communications device 10. As a result, the user can perform a desired manipulation after recognizing the status of the wireless communications device 10.

In particular, in the wireless communications device 10, when the MPU 14 and the current sensor 22 serving as detectors detect the failure in the LCD 20, the MPU 14 converts the manipulation of the dedicated button 15*a* to be valid to notify the user of the status of the wireless communications device 10. Therefore, when the LCD 20 is out of order, that is, even when the screen display function does not work, the user presses the dedicated button 15*a* to correctly recognize the status of the wireless communications device 10. As a result, although the LCD 20 is out of order, the user can perform a desired manipulation after recognizing the status of the wireless communications device 10.

Additionally, once the status of the wireless communications device 10 is recognized, the user can recognize the kind of the current communications mode and, thus, the user becomes aware of which manipulation is valid and which manipulation connects the wireless communications device 10 to where.

Furthermore, once the status of the wireless communications device 10 is recognized, the user can find out whether the wireless communications device 10 is in the service area or out of the service area, and therefore can determine whether or not base station communications through the base station can be performed.

Also, once the status of the wireless communications device 10 is recognized, the user can find out the battery remaining charge amount to thereby estimate how long the corresponding wireless communications device 10 can be used.

Moreover, once the status of the wireless communications device 10 is recognized, the user can recognize the content of the pre-set call number or the content of the telephone book, so that the user can make a desired call.

[2] Modifications of the Present Invention

The present invention is not limited to the above-described embodiment but various modifications or combinations can be made within the range that does not depart from the aspect of the present invention.

[2-1] System, to which the wireless communications device of the present invention is applied, and the Configuration of the Wireless Communications Device will now be explained.

For example, the embodiment of the present invention has been described, by way of example, with respect to the case where the wireless communications device 10 is the wireless communications device of the wireless system 1 illustrated in FIG. 1. However, the present invention is not limited thereto but may be applied to the wireless communications devices of various wireless communications systems. In addition, the wireless communications device of the present invention may include various components other than the components illustrated in FIG. 3, and may include, for example, a position detector using a global positioning system (GPS).

Also, in the above-described embodiment, the MPU 14 is configured to detect the failure in the LCD 20 based on the operation of the driver 21 and the notification from the current sensor 22. However, the present invention is not limited thereto but may be configured so that the MPU 14 detects the failure in the LCD 20 depending on the temperature of the LCD 20. That is, the wireless communications device 10 may include a temperature sensor which detects the temperature of the LCD 20, and the MPU 14 detects the failure in the LCD 20 based on whether or not the temperature detected by the temperature sensor is within a predetermined temperature range.

Therefore, the similar operation effects in the above-described embodiment can be obtained.

[2-2] Notification Contents

Further, the embodiment of the present invention has been described, by way of example, with respect to the case where the MPU 14, the AIU 17, and the speaker 18 serving as the notifying units continuously notify the communications mode, the synchronization state, and the battery remaining charge amount as the state of the wireless communications device 10. However, the notification contents of the notifying units in accordance with the present invention are not limited thereto but may be properly selected and combined. For example, the notification contents of the notifying units may be one of the communications mode, the synchronization state, and the battery remaining charge amount, or may be a pre-set call number and the content of the telephone book, a redial or received call history, or the set information on the wireless communications device 10.

Furthermore, the MPU 14 may set the notification contents from one of the above status information and the user may manipulate the dedicated button 15a by manipulating the manipulating unit 15 to select the content to be notified.

Also, the MPU 14 may be configured to change the notification contents depending on the contents (kind) of the manipulation notification of the dedicated button 15a from the PLD 16. That is, the notifying unit of the present invention may be configured to change the status of the wireless communications device 10 based on the manipulation pattern of the manipulation button 15a to notify the changed status.

For example, when the user presses the dedicated button 15a for a short period of time, the PLD 16 notifies the MPU 14 of a message corresponding to that the dedicated button 15a is pressed for a short period of time. When the user presses the dedicated button 15a for a period of time longer than a predetermined time, the PLD 16 notifies the MPU 14 of a message corresponding to that the dedicated button 15a is pressed for a long period of time.

When the dedicated button 15a is pressed for a short period of time, the MPU 14 is set to continuously notify the user of the communications mode and the synchronization state (communications state). On the other hand, when the dedicated button 15a is pressed longer, the MPU 14 is set to notify the user of the battery remaining charge amount (power source status). In addition, the notification contents based on the manipulation patterns of the dedicated button 15a is also not limited to the above description.

[2-3] Notification Method

Further, the embodiment of the present invention has been described with respect to the case where the notifying units of the present invention are realized by the MPU 14, the AIU 17, and the speaker 18, and the status of the wireless communications device 10 is notified through a voice message as the notification method. However, the present invention is not limited thereto but may notify the status by the beep sound. That is, the storage unit 23 may previously store the output pattern of the beep sound depending on the condition (the status of the wireless communications device 10) illustrated in FIGS. 5A to 5C and the MPU 14 may output the beep sound based on the status of the wireless communications device 10 through the speaker 18.

In addition, the notification means in accordance with the notification units of the present invention are not limited to sound but may be vibration, emission color, or emission pattern. In this case, the storage unit 23 may also previously store the notification pattern (vibration pattern, emission pattern, or emission color) depending on the condition (the status of the wireless communications device 10) illustrated in FIGS. 5A to 5C and the MPU 14 may notify the notification contents based on the status of the wireless communications device 10.

Further, when the notifying unit of the present invention notifies the user of the status of the wireless communications device 10 through vibration, the wireless communications device 10 includes a vibrating unit, serving as the notification unit, vibrating in multiple patterns and the MPU 14 reads the vibration pattern corresponding to the status of the wireless communications device 10 from the storage unit 23 to vibrate the vibrating unit in accordance with the pattern.

Also, when the notifying unit of the present invention notifies the user of the status of the wireless communications device 10 through the emission pattern, the wireless communications device 10 includes a light emitting unit serving as the notification unit for emitting light in multiple patterns and the MPU 14 reads the emission pattern corresponding to the status of the wireless communications device 10 from the storage unit 23 to emit light by the light emitting unit in accordance with the pattern.

Additionally, when the notifying unit of the present invention notifies the user of the status of the wireless communications device 10 through the emission color, the wireless communications device 10 includes an emission unit serving as the notifying unit for emitting colors and the MPU 14 reads the emission color corresponding to the state of the wireless communications device 10 from the storage unit 23 to emit light by the light emitting unit in accordance with the emission color.

[2-4] Others

In the above-described embodiment, the MPU 14 may be configured to drive the wireless communications device 10 in a manner mode of suppressing output sound through the speaker 18 and the notification unit may also be configured to perform the sound notification of the wireless communications device 10 even in a manner mode. That is, it is preferably configured such that the MPU 14 functions as a controller for controlling the output sound through the speaker 18 and the notifying unit notifies the user of the status of the wireless communications device by the manipulation of the dedicated button 15a even in a manner mode where the output sound through the speaker is limited by the controller.

Therefore, even if the LCD 20 is broken in the manner mode, when the user presses the dedicated button 15a, the user can correctly recognize the current status of the wireless communications device 10. That is, it is possible to prevent the sound output of the status notification from being limited even in the manner mode so that the user can always recognize the status of the wireless communications device 10.

Moreover, in the above-described embodiment, when it is determined that the failure in the LCD 20 is detected, the manipulation of the dedicated button 15a is made valid so that the status of the wireless communications device 10 is notified only in a related case. However, the present invention is not limited thereto, and may be configured so that, when the dedicated button 15a is manipulated regardless of the status of the LCD 20, the notifying unit notifies the user of the status of the wireless communications device 10.

Therefore, the user can recognize the status of the wireless communications device at any time only by pressing the dedicated button 15a.

While the invention has been shown and described with respect to the embodiments, it will be understood by those skilled in the art that various changes and modification may be made without departing from the scope of the invention as defined in the following claims.

What is claimed is:

1. A wireless communications device having a plurality of communications modes and performing wireless communications by using one of the communications modes comprising:

a notifying unit configured to determine which one of the communications modes is currently employed by the wireless communications device and notify a user of a status of the wireless communications device corresponding to the currently employed communications mode when a dedicated user interface is manipulated by the user, an output unit configured to output sound; and a controller configured to control the sound from the output unit, wherein the notifying unit notifies the user of the status of the wireless communications device based on a manipulation of the dedicated user interface even when the sound from the output unit is controlled not to be outputted by the controller.

2. The wireless communications device of claim 1, wherein the notifying unit changes notification contents depending on a manipulation pattern of the dedicated user interface.

3. The wireless communications device of claim 1, wherein the notifying unit notifies the user of the status of the wireless communications device by sound.

4. The wireless communications device of claim 1, further comprising a display unit, and wherein the notifying unit notifies the user of the status of the wireless communications device when the user is not allowed to be notified of the status of the wireless communications devices through the display unit.

5. The wireless communications device of claim 1, wherein the status of the wireless communications device includes pieces of information including the name of the currently employed communications mode and the notifying unit consecutively notifies the user of the pieces of information.

6. The wireless communications device of claim 1, wherein the notifying unit selects a notification content corresponding to the currently employed communications mode from multiple notification contents corresponding to the plurality of communications modes and provides the selected notification content as the status of the wireless communications device.

7. The wireless communications device of claim 6, wherein the notifying unit selects two or more notification contents corresponding to the currently employed communications mode from multiple notification contents corresponding to the plurality of communications modes and consecutively provides the selected notification contents as the status of the wireless communications device.

8. The wireless communications device of claim 1, wherein the notifying unit determines whether or not to notify the user of the status of the wireless communications device if the user manipulates the dedicated user interface when the wireless communications device performs the wireless communications.

9. The wireless communications device of claim 1, wherein the communications modes includes a base station communications mode where the wireless communications device communicates with another wireless communications device through a base station, and a direct communications mode where the wireless communications device communicates with said another wireless communications device without passing through the base station, and wherein the notifying unit continuously notifies the user of the currently employed communications mode, a radio wave status and a remaining charge amount of a battery with the sound when the currently employed communications mode is the base station communications mode, and the notifying unit continuously notifies the user of the currently employed communications mode and the remaining charge amount of the battery with the sound without notifying the radio wave status when the currently employed communications mode is the direct communications mode.

10. A wireless communications system comprising:

a base station; and

A wireless communications device having a plurality of communications modes and performing wireless communications by using one of the communications modes, and wherein the wireless communications device includes a notifying unit configured to determine which one of the communications modes is currently employed by the wireless communications device and notify a user of a status of the wireless communications device corresponding to the currently employed communications mode when a dedicated user interface is manipulated by the user, and the wireless communications device further comprises an output unit configured to output sound; and a controller configured to control the sound from the output unit, wherein the notifying unit notifies the user of the status of the wireless communications device based on a manipulation of the dedicated user interface even when the sound from the output unit is controlled not to be outputted by the controller.

11. The wireless communications system of claim 10, wherein the status of the wireless communications device includes pieces of information including the name of the currently employed communications mode and the notifying unit consecutively notifies the user of the pieces of information.

12. The wireless communications system of claim 10, wherein the notifying unit selects a notification content corresponding to the currently employed communications mode from multiple notification contents corresponding to the plurality of communications modes and provides the selected notification content as the status of the wireless communications device.

13. The wireless communications system of claim 12, wherein the notifying unit selects two or more notification contents corresponding to the currently employed communications mode from multiple notification contents corresponding to the plurality of communications modes and consecutively provides the selected notification contents as the status of the wireless communications device.

14. The wireless communications system of claim 10, wherein the notifying unit determines whether or not to notify the user of the status of the wireless communications device if the user manipulates the dedicated user interface when the wireless communications device performs the wireless communications.

15. The wireless communications system of claim 10, wherein the notifying unit changes notification contents depending on a manipulation pattern of the dedicated user interface.

16. The wireless communications system of claim 10, wherein the notifying unit notifies the user of the status of the wireless communications device by sound.

17. The wireless communications system of claim 10, further comprising a display unit, and wherein the notifying unit notifies the user of the status of the wireless communications device when the user is not allowed to be notified of the status of the wireless communications devices through the display unit.

18. The wireless communications system of claim 10, wherein the communications modes includes a base station communications mode where the wireless communications device communicates with another wireless communications device through a base station, and a direct communications mode where the wireless communications device communicates with said another wireless communications device without passing through the base station, and wherein the notifying unit continuously notifies the user of the currently employed communications mode, a radio wave status and a remaining charge amount of a battery with the sound when the currently employed communications mode is the base station communications mode, and the notifying unit continuously notifies the user of the currently employed communications mode and the remaining charge amount of the battery with the sound without notifying the radio wave status when the currently employed communications mode is the direct communications mode.

19. A wireless communications device having a plurality of communications modes and performing wireless communications by using one of the communications modes comprising:

a notifying unit configured to determine which one of the communications modes is currently employed by the wireless communications device and notify a user of a status of the wireless communications device corresponding to the currently employed communications mode when a dedicated user interface is manipulated by the user, wherein the communications modes has at least two communications modes including a base station communications mode where the wireless communications device communicates with another wireless communications device through a base station, and a direct communications mode where the wireless communications device communicates with said another wireless communications device without passing through the base station, and wherein the notifying unit continuously notifies the user of the currently employed communications mode, a radio wave status and a remaining charge amount of a battery with sound when the currently employed communications mode is the base station communications mode, and the notifying unit continuously notifies the user of the currently employed communications mode and the remaining charge amount of the battery with the sound without notifying the radio wave status when the currently employed communications mode is the direct communications mode.

* * * * *